Jan. 1, 1963    A. J. HORNFECK    3,071,006
TRANSMISSION MEANS
Filed March 9, 1959    2 Sheets-Sheet 2

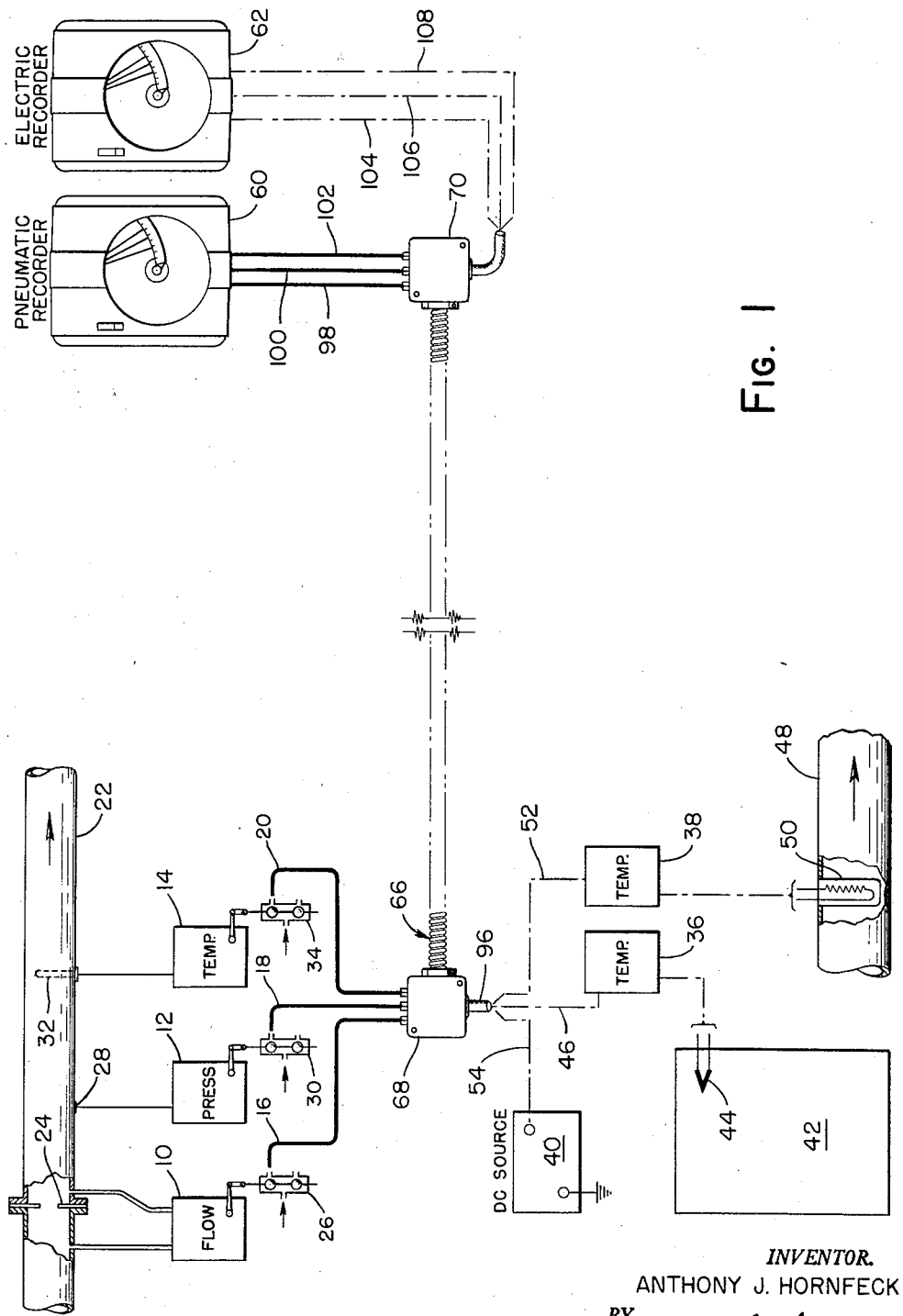

INVENTOR.
ANTHONY J. HORNFECK
BY
John F. Luhrs
ATTORNEY

United States Patent Office 3,071,006
Patented Jan. 1, 1963

3,071,006
TRANSMISSION MEANS
Anthony J. Hornfeck, South Euclid, Ohio, assignor to Bailey Meter Company, a corporation of Delaware
Filed Mar. 9, 1959, Ser. No. 797,975
11 Claims. (Cl. 73—432)

This invention relates to indicating and control apparatus and more particularly to a transmission means for transmitting electrical and fluid signals between remote locations.

In modern day instrumentation systems, measurements of variables such as pressure, temperature, etc. are taken and transmitted to a central control center or to some other remote location from which control signals are sent out to controllers such as a pneumatically operated valve or electrical motor. As a result of the application of modern technology to instrumentation, such systems have become extremely complex normally resulting in the use of many transmission conduits for transmitting the various signals between locations. In addition to the complexity of these modern systems the transmission problem is further increased through the use of instrumentation systems employing different types of transmitting signals, for example, both pneumatic and electrical signals.

A modern instrumentation system may involve the use of electrical data logging apparatus employing electric transmission signals and in addition controlling and recording apparatus responsive to pneumatic and/or electrical signals. As is well known to those skilled in the art both the electrical and fluid type of transmission systems have separate advantages which make each of them highly desirable in many applications. For this reason, in large complex instrumentation systems use of both types of signals will be found to achieve optimum performance.

As a result of the trend toward centralization or the use of a control center, it has been necessary to greatly increase the amount of piping and wiring forming the transmission system between the control center and the measurement and control points. Frequently there may be as many as 500 or more pipes and wires going from such a control center. These large quantities of pipes and wires has resulted in considerable attention being directed to the problem of properly locating, supporting and protecting the same.

In the past attempts have been made to simplify the methods of supporting and protecting the piping and wiring employed in instrumentation systems. For example, Patent No. 2,578,280 issued to Clayton H. Barnard on Dec. 11, 1951, discloses a semi-flexible assembly of tubes arranged in a tubing bundle or cluster to in effect transmit a plurality of pneumatic signals through a single conduit. Similarly, multi-wire cables are available for transmitting a plurality of electrical signals through a single conduit. Such transmission cables whether for pneumatic or electrical signals serve the purpose of providing a single support for a number of transmission lines thus reducing the complexity of the entire transmission system.

While the presently available multi-line transmission conduits have to some extent alleviated the transmission problems in modern instrumentation systems, the problems are still found to exist in systems employing both fluid and electrical transmitting signals. In these systems separate conduits still are run for the fluid and electrical signals resulting in the use of many junction boxes and transmission conduits.

It is a principal object of my invention to provide a transmission conduit for transmitting between remote locations both fluid signals and electrical signals.

Another object of the invention is to provide a relatively self-supporting accumulation of metal tubes in combination with insulating junction boxes for transmitting both electrical and fluid signals.

Other objects and advantages will become apparent from the following description taken in connection with the accompanying drawings wherein:

FIG. 1 is a schematic illustration of a portion of an instrumentation system employing the transmission means embodying this invention;

Figure 3:
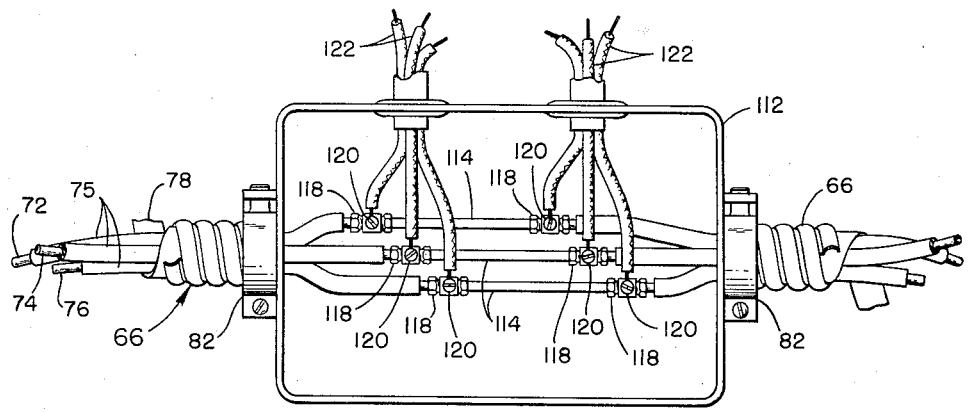
FIGS. 3 and 4 are sectional views similar to FIG. 2 illustrating other types of junction boxes.

Referring now to FIG. 1 of the drawings, for purposes of illustrattion there is shown the combination of both pneumatic and electrical measuring and transmitting apparatus in an instrumentation system. More particularly, the pneumatic portion of the system as shown comprises three transmitting devices 10, 12, and 14 arranged to establish pneumatic signals in conduits 16, 18 and 20 representative of the flow rate, pressure and temperature respectively of a fluid flowing in pipe 22. The transmitting device 10 is responsive to the differential pressure across a primary measuring element 24 and operative to actuate a pilot valve 26 to establish a pneumatic signal in conduit 16 proportional to the flow rate. Similarly, the transmitting device 12 is responsive to the pressure in conduit 22 as sensed through an opening 28 to position a pilot valve 30 and establish a proportional pneumatic pressure in conduit 18. Transmitting device 14 is responsive to the temperature as measured by a measuring element 32 to position pilot valve 34 and establish a proportional pneumatic pressure in conduit 20.

The electrical equipment of the system comprises a pair of transmitting devices 36 and 38 and a D.-C. power supply 40. The transmitting device 36 is responsive to the temperature in a chamber 42 as sensed by a measuring element such as a thermocouple 44 to establish an electrical signal in a conductor 46. The transmitting device 38 is responsive to the temperature of a fluid flowing in a conduit 48 as sensed by a measuring element 50 to establish a proportional electrical signal in conductor 52. One side of the power supply 40 is grounded while the other terminal is connected to the conductor 54.

A pair of recording instruments 60 and 62 are illustrated schematically as located remotely from the electrical and pneumatic transmitting devices and power supply such as in the control center of an instrumentation system. The recording instrument 60 is provided with three pneumatic receivers (not shown) responsive to the pneumatic signal pressures established by the transmitting devices 10, 12 and 14 respectively. A movable pen arm is associated with each receiver for movement over a circular chart in accordance with variations in the signal pressure to provide a continuous record of the measured variable.

The recording instrument 62 is provided with three electrical receivers (not shown) responsive to the output of power supply 40 and electrical signals established by the transmitters 36 and 38 respectively. Similarly, each electrical receiver is adapted to position a pen arm over a circular chart to provide a continuous record of each variable.

Transmitting and recording apparatus of the type described above are well known to those skilled in the art and therefore further description of the operation and structure thereof is deemed unnecessary. Furthermore, the various transmitting and recording instruments are disclosed only for the purpose of illustrating an instrumentation system employing both pneumatic and electric signals and not for purposes of limitation.

Referring now to the transmission means embodying my invention there is shown a single conduit 66 extending between the recording instruments 60 and 62 and the remotely located transmitting devices and power supply. Junction boxes 68 and 70 are mounted on opposite ends of the conduit 66 to provide a means for connecting the various conductors and conduits to the conduit 66.

Figure 2:
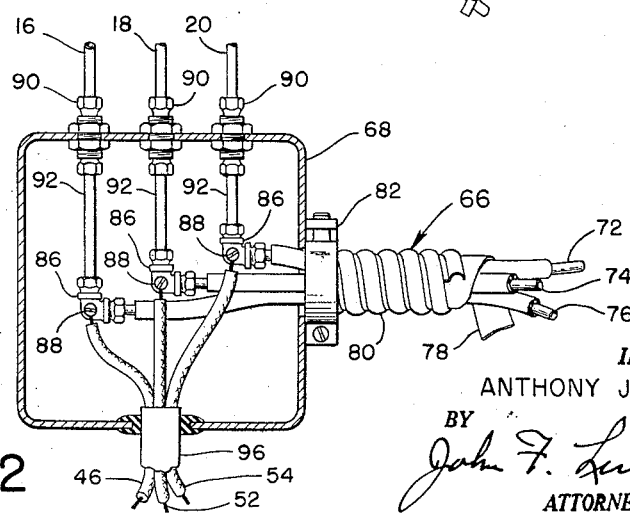
FIG. 2 is a sectional view of one of the junction boxes and a portion of the transmission conduit illustrated in FIG. 1.

Referring now to FIG. 2 of the drawings, the transmission conduit 66 comprises a plurality (in this case three) of thin wall metal tubes 72, 74 and 76 formed from an electrically conductive material such as copper or aluminum. The tubes 72, 74 and 76 are each wrapped or enclosed in suitable electrical insulation 75 and fabricated by a machine into a bundle or cluster. The resulting cluster is subsequently twisted until each tube forms a gentle helix resulting in a unitary flexible construction. Following the twisting of the cluster a spiral wrapping 78 of tape-like form which may be impregnated cloth, plastic or other flexible wrapping material is applied to closely bind the bundle together to retain its shape. Or the wrapping 78 may be a monolithic plastic coating having heat and/or electrical insulating properties. To complete the assembly a metallic interlocking flexible sheath 80 is applied over wrapping 78 to provide a flexible protective outer covering. For a more detailed description of the method of forming such a tubing cluster, reference is made to Patent No. 2,578,280 issued to Clayton H. Barnard.

The transmission conduit illustrated in FIG. 2 differs in construction from that disclosed and claimed in the aforementioned Barnard patent in the provision of the insulation covering 75 on each of the tubes 72, 74 and 76. The purpose of insulating the tubes in this manner is to enable each of the tubes to simultaneously transmit an electrical signal and a pneumatic signal. This result is accomplished through the use of junction boxes 68 and 70 which provide a means for separating the pneumatic and electrical signals at each end of the transmission conduit 66. Thus, the transmission conduit 66 is capable of transmitting three fluid signals and three electrical signals with the number of tubes shown. As will be apparent to those skilled in the art, however, the number of tubes may be greatly increased to provide for the transmission of additional signals.

Referring now to the structural details of the junction boxes 68 and 70, there is shown in FIG. 2 a sectional view of the box 68. A fitting or bracket 82 is utilized to secure the flexible sheath 80 to one side of the box 68 and the metal tubes 72, 74 and 76 are extended through a suitable opening in the wall of the box aligned with the bracket 82 for connection to metallic elbow fittings 86 respectively which are shown as comprising elbow type of fittings. The fittings 86 are provided with terminal screws 88 respectively. The ends of pneumatic conduits 16, 18 and 20 are connected to suitable bulkhead fittings 90 which in turn are connected to the elbow fittings 86 respectively by short sections of hollow electrically non-conductive tubes 92 formed from plastic or other suitable material.

The electrical conductors 46, 52 and 54 may be formed if desired into a single electric cable 96 as illustrated schematically in FIGS. 1 and 2. One end of the cable 96 is received in a suitable opening in the lower wall of the box 68 and the three conductors are separated and connected at their ends to the elbows 86 by the terminal screws 88.

With the above described structure both pneumatic and electrical signals are supplied to the conduit 66 for transmission to the junction box 70, but the pneumatic and electrical signals are isolated at each end of the transmission conduit. At the box 68, for example, a pneumatic signal is supplied to tube 72 from conduit 16 through tube section 92 and elbow fitting 86. In addition an electrical signal is supplied to tube 72 from conductor 46 by means of the electrical connection at terminal screw 82. The non-conductive tube section 92 isolates the pneumatic signal from the electrical signal exteriorly of the box 68 to thereby prevent grounding of the electrical circuit. Thus, as a result of the insulation of the tubes 72, 74 and 76 in conduit 66 and the structure of the junction box 68 a pneumatic and electrical signal may be supplied to each of the tubes 72, 74 and 76 for transmission to the junction box 70.

At the other end of the conduit 66, the junction box 70 serves to separate the electrical and pneumatic signals for distribution to suitable pneumatic conduits 98, 100 and 102 and electrical conductors 104, 106 and 108 which extend to their associated recording instruments 60 and 62 as indicated schematically in FIG. 1. The structure of the box 70 is identical to that of box 68, the electrical conductors 104, 106 and 108 being connected to terminal screws such as illustrated in FIG. 2 and the pneumatic conduits being connected to suitable bulkhead fittings which are connected to the elbow fittings by non-conductive sections of tubing to provide the desired isolation and separation of the pneumatic and electrical signals.

The advantages of the invention will now be apparent. By using a main transmission conduit having a large number of tubes, the transmission means in even complex instrumentation systems utilizing both pneumatic and electrical signals can be reduced to one or two transmission conduits substantially eliminating the transmission problems normally encountered. The need for separate transmission lines for the pneumatic and electrical components is eliminated, greatly reducing the cost as well as the installation problems.

In the system illustrated in FIG. 1, junction boxes 68, 70 are shown at the ends of the conduit 66 for separating the electrical and pneumatic signals at these points. FIG. 3 of the drawings illustrates the structure of a junction box 112 for removing and/or introducing electrical signals to the tubes 72, 74 and 76 at a point intermediate the ends of the main transmission conduit 66. With this arrangement the conduit 66 is cut and the resulting ends coupled by means of junction box 112. The adjacent ends of tubes 72, 74 and 76 are connected by non-conductive tube sections 114 and metallic pipe couplings 118. Each of the couplings 118 is provided with a terminal screw 120 to which an electrical conductor 122 may be connected as indicated in FIG. 3.

With the junction box illustrated in FIG. 3 electrical signals may be removed at one end of the non-conductive tube sections 114 while different electrical signals may be introduced to the tubes 72, 74 and 76 at the other end of the connecting tube sections for transmission over another portion of the main transmission conduit 66. If it is only desired to remove or introduce an electrical signal from or into one of the tubes 72, 74 and 76, the desired tube may be cut and the other tubes may be left continuous through the box 112.

Figure 4:
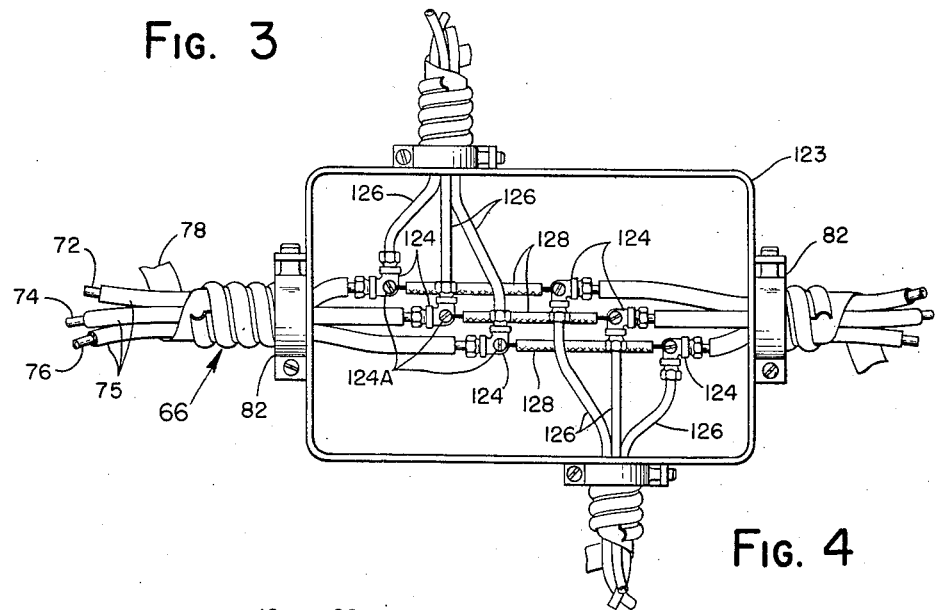

FIG. 4 of the drawings illustrates a junction box 123 for removing and/or introducing pneumatic signals at appropriate points along a main transmission conduit 66. The conduit 66 is cut and the adjacent ends of the tubes 72, 74 and 76 are provided with suitable electrically conductive elbow fittings 124 from which non-conductive tube sections 126 extend exteriorly of the junction box. To conduct the electrical signals through the box 123 insulated conductors 128 are connected to adjacent fittings 124. With this arrangement, the pneumatic signals are removed from the main transmission conduit 66 within the junction box 123 while additional pneumatic signals may be introduced for transmission over another portion of the transmission conduit 66.

With the junction boxes as illustrated in FIGS. 3 and 4, pneumatic and electrical signals may be introduced and removed as desired along a main transmission circuit or trunk line thus rendering the invention applicable to any instrumentation system having equipment located in a plurality of remote locations.

It will be apparent to those skilled in the art that many changes may be made in the construction and arrangement of parts without departing from the scope of the invention as defined in the appended claims.

What I claim as new and desire to secure by Letters Patent of the United States is:

1. A transmission means comprising, a bundle of hollow tubes of electrically conductive material forming a unitary construction, insulation between the exterior surfaces of said tubes to enable each of said tubes to conduct simultaneously an electrical intelligence signal through its electrically conductive material and a pneumatic intelligence signal through the hollow interior thereof, a junction box fixed to said bundle, electrical conductors extending into said box for connection to said tubes, pneumatic conduits extending into said box for connection to said tubes, and means for electrically insulating said pneumatic conduits from said tubes and said electrical conductors.

2. A transmission means as claimed in claim 1 wherein said insulating means comprise short tube sections of non-conductive material connecting said pneumatic conduits with said tubes respectively.

3. A signal transmission means for a control apparatus having a plurality of electric and pneumatic transmitters at one location for establishing electric and pneumatic intelligence signals respectively representative of a plurality of variable conditions and having a plurality of remotely positioned electric and pneumatic receivers responsive to the signals respectively, the combination comprising, a transmission conduit for transmitting both electrical and pneumatic intelligence signals including a bundle of parallel hollow electrically conductive tubes forming a unitary construction, insulation means between said tubes for electrically isolating said tubes to enable each of said tubes to transmit simultaneously a pneumatic intelligence signal through the hollow interior thereof and an electrical intelligence signal through its electrically conductive material, and means at each end of said transmission conduit for separating said signals.

4. In a control apparatus as claimed in claim 3 wherein each of said means includes a junction box, and tube sections of electrically non-conductive material are connected to said tubes respectively within said junction boxes for isolating said pneumatic signals.

5. In a control apparatus as claimed in claim 4 wherein electric conductors are connected to said tubes in said junction box for isolating said electric signals.

6. A transmission means for transmitting an electrical intelligence signal and a pneumatic intelligence signal between remote locations comprising, a hollow transmission tube formed from electrically conductive material to enable said tube to transmit an electrical intelligence signal through its electrically conductive material and a pneumatic pressure intelligence signal through the hollow interior thereof, terminal means at one end of said tube including an electrically conductive wire for applying an electrical signal to said tube and electrically non-conductive conduit means for applying a pneumatic pressure signal to said tube, and terminal means at the other end of said tube including an electrically conductive wire for receiving the electrical signal from said tube and electrically non-conductive conduit means for receiving the pneumatic pressure signal from said tube.

7. A transmission means for a plurality of electric and pneumatic intelligence signals comprising, a bundle of metallic electrically conductive tubes having a protective outer covering and insulation to electrically isolate said tubes to enable each of said tubes to transmit simultaneously a fluid pressure intelligence signal through the hollow interior thereof and an electric intelligence signal through its electrically conductive material, a junction box attached to said bundle, electrically conductive wires extending into said junction box for connection to said tubes to conduct to or from said tubes electric intelligence signals independently of the pneumatic intelligence signals transmitted by said tubes, fluid pressure conduits extending into said junction box for connection to said tubes, said conduits being electrically insulated from said tubes to transmit to or from said tubes fluid pressure intelligence signals independently of the electric intelligence signals transmitted by said tubes.

8. A transmission means for a plurality of electric and pneumatic intelligence signals comprising, a semi-flexible bundle of metallic electrically conductive tubes having a protective outer covering and insulation within said bundle to electrically isolate said tubes to enable each of said tubes to transmit simultaneously a fluid pressure intelligence signal through the hollow interior thereof and an electric intelligence signal through its electrically conductive material, a junction box connecting at least two sections of said bundle, at least one electrically non-conductive fluid pressure conduit connecting a tube in one of said sections with a tube in the other of said sections within said junction box for transmitting at least one fluid pressure intelligence signal through said junction box independently of electric intelligence signals conducted by the connected tubes, and at least one electrically conductive wire extending into said junction box for connection to one of said tubes for conducting an electric intelligence signal to or from the same independently of a fluid pressure intelligence signal transmitted thereby.

9. A transmission conduit for a plurality of electric and pneumatic intelligence signals comprising, a semi-flexible bundle of metallic electrically conductive tubes having a protective outer covering and insulation within said bundle to electrically isolate said tubes to enable each of said tubes to transmit a fluid pressure intelligence signal through the hollow interior thereof and an electric intelligence signal through its electrically conductive material, a junction box connecting two sections of said bundle, at least one electrically conductive wire electrically connecting a tube of one of said sections with a tube of the other of said sections for transmitting at least one electric intelligence signal through said junction box independently of fluid pressure signals transmitted by the connected tubes, at least one fluid pressure conduit extending into said junction box, and an electrically non-conductive coupling between said conduit and one of said tubes for transmitting a fluid pressure intelligence signal to or from the same independently of an electric intelligence signal conducted thereby.

10. A transmission conduit for transmitting electrical and fluid pressure intelligence signals simultaneously between remote locations comprising, a bundled cluster of hollow tubes of electrically conductive material forming a unitary construction, electrical insulation between the exterior surfaces of said tubes to electrically isolate the same and to enable each of said tubes to transmit simultaneously a fluid pressure intelligence signal through the hollow interior thereof and an electrical intelligence signal through its electrically conductive material, and means at each end of said transmission conduit for separating the signals.

11. A transmission conduit as claimed in claim 10 wherein said bundled cluster comprises a plurality of metallic tubes having a long-slow twist and having a flexible protective outer covering.

References Cited in the file of this patent

UNITED STATES PATENTS

| | | |
|---|---|---|
| 2,578,280 | Barnard | Dec. 11, 1951 |
| 2,718,144 | Hornfeck | Sept. 20, 1955 |
| 2,740,095 | Somes | Mar. 27, 1956 |
| 2,884,940 | Gorrie | May 5, 1959 |